Dec. 31, 1940.  F. M. GUY  2,227,306
FLEXIBLY MOUNTED HANGER
Filed Sept. 24, 1938
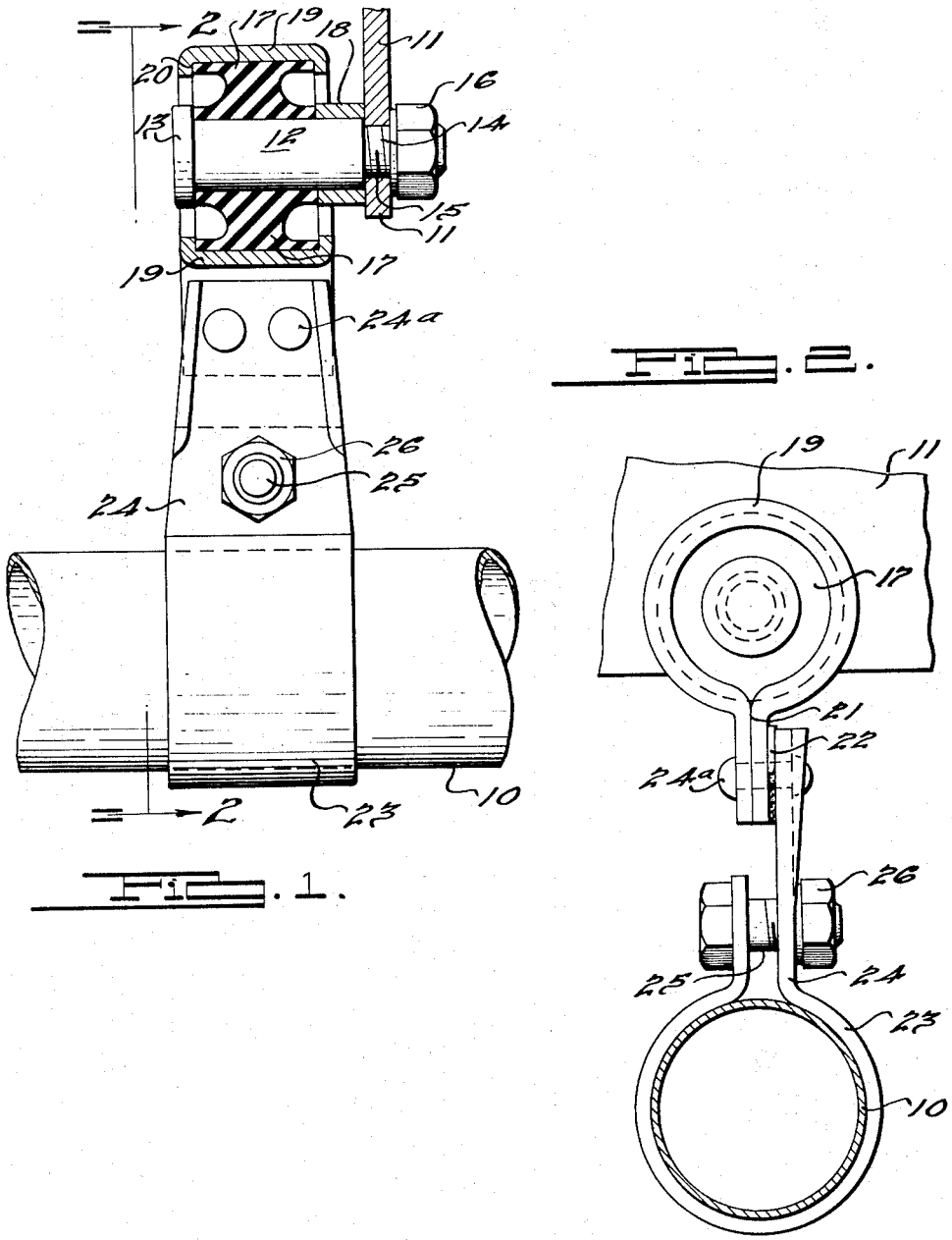
INVENTOR
Frederick M. Guy.
BY Dike, Calver & Gray
ATTORNEYS.

Patented Dec. 31, 1940

2,227,306

UNITED STATES PATENT OFFICE 2,227,306

FLEXIBLY MOUNTED HANGER

Frederick M. Guy, Detroit, Mich., assignor to Guy and Murton, Incorporated, Detroit, Mich., a corporation of Michigan Application September 24, 1938, Serial No. 231,514

3 Claims. (Cl. 248—54)

The present invention relates to improvements in a flexibly mounted hanger which, in one of its embodiments, is particularly adapted for use as a flexible support for a pipe or the like which may be subjected to forces causing its movement relative to the supporting surface. In one of its embodiments the present invention is particularly adapted for use in flexibly securing the exhaust pipe, muffler and tail pipe of a motor vehicle to the chassis of the motor vehicle in such a manner as to permit relative movement of the exhaust pipe, muffler and tail pipe relative to the vehicle chassis.

It is a principal object of the present invention to provide a flexibly mounted hanger or support which allows relative movement within predetermined limits of the supported object relative to a fixed point of attachment of the hanger to a supporting member.

Another object of the invention is to provide a flexibly mounted hanger particularly adapted for supporting a pipe or similar object and which permits movement of the pipe relative to the supporting surface so that the entire pipe may move bodily within restricted limits relative to the supporting surface, thus permitting the use of a pipe which is of relatively lighter construction than pipes heretofore required where the pipe construction is forced to absorb the strains due to forces imposed thereon causing movement of the pipe relative to the supporting surface.

It is another object of the invention to provide a flexibly mounted hanger particularly adapted for use in supporting a rigid pipe and to permit its bodily movement relative to the supporting surface, in which provision is made to eliminate noise due to the movement of the pipe relative to the supporting surface.

A further object of the invention is to provide a flexibly mounted hanger or pipe support which provides means for thermally insulating the hanger portion from the supporting surface, thus providing a device which is readily applicable for use in supporting either a heated or a cooled pipe line and preventing the ready transfer of heat to or from the supporting surface. Thus in one embodiment of the present invention the flexibly mounted hanger protects the supported pipe line from damage due to heat transfer to or from a supporting surface having temperatures differing from the temperatures of the supported pipe. Likewise, the hanger of the present invention protects the supporting surface from damage due to the transmission of heat from the pipe line. This feature also permits the maintenance of more constant temperatures in the pipe line despite variations in the heat conditions on the supporting surface.

Another object of the invention is to provide a flexibly mounted hanger in which vibrations transmitted from the pipe are absorbed in a resilient supporting medium.

Another object of the invention is to provide a flexibly mounted hanger which has relatively few and simple parts, each of which may be constructed separately and which, if desired, may be manufactured, shipped and handled in a disassembled state and which may be readily, quickly and conveniently assembled and installed when its use is desired. In addition, a structure embodying the present invention is relatively inexpensive to manufacture and install.

Other objects of this invention will appear in the following description and appended claims, reference being had to the accompanying drawing forming a part of this specification, wherein like reference characters designate corresponding parts in the several views.

Fig. 1 is a side elevation partially in section showing one form of the present invention in its assembled and applied condition as when applied to a motor vehicle construction to provide a flexible support for the tail pipe, muffler and exhaust pipe assembly of a motor vehicle.

Fig. 2 is a section taken substantially on the lines 2—2 of Fig. 1 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, one form of the present invention is there illustrated by way of example as providing an immediate support for a pipe member 10 which, in the present instance, represents the tail pipe of the muffler of a motor vehicle. In conventional constructions, the exhaust pipe, muffler and tail pipe assembly is anchored to and supported from a portion of the motor vehicle chassis represented in the present instance by the bracket member 11, which is attached to a suitable part of the motor vehicle chassis (not shown). It is to be understood, however, that the member 10 may be any other type of pipe or rod with which it is desired to use the present invention and the bracket 11 may be attached to any desired point for supporting the flexibly mounted hanger and pipe assembly.

Referring to Fig. 1, a stud 12 having a head 13 at one end and having an extended pin portion 14 preferably of lesser diameter than that of the body of the stud 12, extends through an opening 15 in the bracket 11. Due to the reduced diameter of the extending portion 14, a shoulder portion is formed as shown in Fig. 1 and this abuts against a surface of the bracket 11 to assist in holding the stud 12 securely in place and preferably at right angles to the surface of the bracket 11.

In the preferred embodiment of the invention here shown by way of example, the stud 12 is mounted on the bracket 11 in such a manner that the longitudinal axis of the stud 12 lies in a plane substantially parallel to the plane of the longitudinal axis of the supported pipe 10. The stud 12 may be secured in any desired manner to the bracket 11, such for example as by the screw-threaded nut 16. If desired, however, the stud 12 may be riveted, welded or otherwise secured to the bracket 11.

Secured on the stud 12 is a generally cylindrical resilient member or bushing 17 formed from resilient material, such for example as resilient rubber, or the like. The bushing is preferably so formed that the central portion adjacent the stud 12 and the outer portion thereof may be moved relative to each other along lines substantially parallel to the longitudinal axis of the stud 12. In a preferred embodiment of the invention this movement in the resilient bushing is permitted to a greater extent than the relative movement of the central portion in a radial direction relative to the outer portion. It will thus be seen that the resilient bushing provides a resilient load-carrying element which acts as a resilient cushion and also permits relative longitudinal movement as well as relative radial movement of the connected members.

In a preferred embodiment of the invention the bushing is preferably surface bonded to the stud 12 but may be secured thereto by a pressed fit. In either event a spacer sleeve 18 is preferably interposed between the adjacent surface of the bracket 11 and the end of the central portion of the bushing 17. Thus the resilient bushing 17 may be secured to the surfaces of the stud 12 as well as to the head 13 and the sleeve 18.

The outer surfaces of the bushing 17 are held in a retaining member 19 which as shown is provided with annular flanges 20 which form a flanged pocket in which the outer surfaces of the bushing 17 are retained. If desired, the outer surfaces of the bushing 17 may be surface bonded to the interior of the member 19. As an alternative, the bushing may be secured in the member 19 by frictional engagement of the adjacent surfaces thereof, in which instance the bushing will be retained against longitudinal displacement from the member 19 due to the restraining action of the annular flanges 20.

If desired, the bushing 17 may be provided with a sleeve extending around its outer circumference and a core extending through the inner opening, in accordance with the disclosures of my United States Patent No. 1,978,940. In this instance the core is retained on the stud 12 by frictional engagement with the surface of the stud 12 and by contact with the head 13 and the spacer member 18, while the outer surface of the bushing is retained in the member 19 by frictional engagement of the adjacent surfaces and by the restraining action of the flanges 20.

The member 19 is preferably of generally cylindrical shape and has an extending end portion 21 which forms a flange which permits the attachment of the lower clamp member 23. Interposed between the extending arm 24 of the clamp member 23 and the extending arm 21 of the member 19, is a spacing member 22 formed of thermally insulating material such as fiber or the like. Such member being interposed between the said clamp members, it will be observed that a flow of heat from the lower member to the upper member or vice versa is retarded. The clamp 23 and its extending arm 24 are secured to the depending arm 21 of the member 19 by means of securing members 24a, which in the embodiment here shown are in the form of rivets. However, any other preferred type of securing means may be employed.

In the form of the invention shown herein, the clamp 23 is preferably formed from a metallic strap which is bent to provide a generally rounded portion which is adapted to surround and enclose the pipe 10 and to provide an open top portion so as to permit an adjustable clamping action. The open top portion is adjustably opened or closed by means of the bolt 25 and the nut 26 which cause the member 23 to exert a clamping action on the pipe 10. It is to be understood, however, that the type of clamp 23 here shown is but one preferred type and that other types of clamps, such for example as jaw clamps or the like, may be used within the scope of the present invention since the purpose of the clamping mechanism is to grip the pipe 10 in a firm manner.

It will also be understood that while the present invention has been described as providing one supporting unit to the pipe 10, that one or more of such units may be utilized as desired.

The assembly and application of a flexible hanger embodying the present invention is as hereinafter described.

The upper portion of the flexible supporting device of the present invention, including the bushing 17 and the member 19, may be secured to the clamp member 23. The stud 12 may then be connected with the bracket 11 and the clamp portion 23 may be secured to the pipe 10. If desired, the flexible hanger of the present invention may be installed in two units; the first, consisting of the stud 12, the resilient bushing 17 and the member 19, may be mounted on the bracket 11, and the second, comprising the clamp 23, may be clamped on the pipe 10. Thereafter the two portions may be united by the connecting members 24a.

From the foregoing it will be seen that the present invention provides a flexible hanger particularly adapted to support a pipe member and to permit such member to be movable relative to a fixed supporting surface. The members are interconnected through the medium of a resilient element, preferably resilient rubber, which may be distorted either radially or in a longitudinal direction to accommodate the movement of the pipe 10 relative to the bracket 11. It will be seen, therefore, that the pipe engaging clamp 23, together with the pipe 10, may move in relation to the fixed stud 12 secured to the bracket 11, such movement being possible in either an upward, downward or lengthwise direction or in any combination of such directions required in response to the forces applied to the pipe 10 which cause its movement relative to the bracket 11. Thus, a pipe or pipe line may be supported by one or more of the flexibly mounted hangers of the present invention in such a manner as to permit relative movement between the supporting bracket and the pipe without requiring, as in the case of conventional types of hanger mechanisms, the absorption of the strains by the pipe member.

The thermally insulating member 22 will be seen to retard the rate of heat transfer between the two parts of the flexibly mounted hanger and thus acts to protect the resilient member 17 from undue deterioration due to the transmission of heat thereto from the pipe 10. This is a particularly important feature where the hanger embodying the present invention is utilized as the supporting hanger for a heated pipe 10. If desired, such thermal insulator may be omitted if the conditions under which the bracket is to be used do not justify its inclusion in the device.

The invention has been found to be particularly desirable in supporting the tail pipe of a motor vehicle muffler, which in turn is rigidly connected with the exhaust pipe. In conventional motor vehicle constructions the engine is mounted on the chassis in such a manner as to permit movement of the engine relative to the chassis. The exhaust manifold is rigidly connected with the engine and the exhaust pipe, muffler and tail pipe assembly is rigidly connected with the exhaust manifold. It will thus be seen that movements of the engine relative to the chassis will be transmitted to the rigidly connected exhaust manifold, exhaust pipe, muffler and tail pipe. In order to support this assembly, a flexible hanger of the present invention may be attached to the tail pipe and to such other portions of the exhaust pipe or muffler as may be desired. The flexible mounting of the present invention being adapted to permit relative movement of the connected pipe in any direction relative to the chassis, it will be seen that breakage due to movement of the pipe relative to the chassis is eliminated. In addition, the provision of the thermal insulating member 22 prevents the transmission of heat from the exhaust pipe, muffler and tail pipe assembly to the resilient bushing 17, and thus preserves the bushing 17 against excessive deterioration.

As will be seen from the foregoing, the construction here disclosed provides a hanger in which the pipe 10 and the clamp attached thereto may move about the stud 12 as an axis and relative to the bracket 11, either in the direction of the longitudinal axis of the stud 12, or in a vertical plane intersecting such axis. In addition, the hanger and pipe may oscillate circumferentially about the stud 12, thus permitting the pipe and hanger to swing as a pendulum about the stud 12 as the pivoting axis.

I claim:

1. A flexibly mounted pipe hanger comprising a pipe clamp having a pipe-engaging portion and an upstanding arm extending therefrom, a hanger-supporting stud adapted to be rigidly attached to a supporting surface, a resilient bushing carried by said stud, and a flanged retaining member having depending end portions connected with said arm and a ring-like portion encompassing said resilient bushing and adapted to permit a limited universal movement between said pipe clamp and said supporting stud, and a thermal insulating member interposed between the upstanding arm of said pipe clamp and the depending end portions of said flanged retaining member to arrest the transfer of heat between said clamp and said retaining member.

2. A flexibly mounted pipe hanger comprising a pipe clamp having a pipe-engaging portion and an arm extending therefrom, a hanger-supporting stud adapted to be rigidly attached to a supporting surface, a resilient bushing carried by said stud, a one-piece flanged retaining member having a lower end portion connected with said arm and having an annulus engaging and gripping said resilient bushing, thereby providing a positive attachment of the hanger to the stud while permitting a limited universal movement between said clamp and said supporting stud through the medium of the resilient bushing, and a thermal insulating member interposed between said arm and the lower end portion of said retaining member to arrest the transfer of heat between said pipe clamp and said retaining member.

3. A flexibly mounted pipe hanger comprising a rigid supporting stud having its longitudinal axis extending on a line substantially parallel to the longitudinal axis of a pipe to be supported therefrom, a pipe clamp, a connector rigidly secured to said clamp and having a flanged pocket, a rubber bushing mounted on said stud and maintained in the flanged pocket of said connector and providing a resilient connection between said pipe clamp and said rigid supporting stud while permitting a limited universal movement therebetween, and a thermal insulating member interposed between adjacent portions of the pipe clamp and connector to arrest the transfer of heat between said pipe clamp and said connector.

FREDERICK M. GUY.